US012005698B2

(12) United States Patent
Kanda

(10) Patent No.: US 12,005,698 B2
(45) Date of Patent: Jun. 11, 2024

(54) HEATING DEVICE AND LIQUID DISCHARGE APPARATUS

(71) Applicant: Yuuta Kanda, Kanagawa (JP)

(72) Inventor: Yuuta Kanda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 101 days.

(21) Appl. No.: 17/958,450

(22) Filed: Oct. 3, 2022

(65) Prior Publication Data

US 2023/0113997 A1 Apr. 13, 2023

(30) Foreign Application Priority Data

Oct. 11, 2021 (JP) ................................ 2021-166828

(51) Int. Cl.
*B41J 11/00* (2006.01)

(52) U.S. Cl.
CPC ...... *B41J 11/00218* (2021.01); *B41J 11/0022* (2021.01); *B41J 11/0024* (2021.01)

(58) Field of Classification Search
CPC .............. B41J 11/00218; B41J 11/0022; B41J 11/0024
See application file for complete search history.

(56) References Cited

U.S. PATENT DOCUMENTS

| | | | | |
|---|---|---|---|---|
| 2013/0052601 | A1* | 2/2013 | Kumai | B41J 29/377 271/264 |
| 2014/0270834 | A1 | 9/2014 | Seshita et al. | |
| 2017/0269522 | A1 | 9/2017 | Kubota et al. | |
| 2017/0269524 | A1 | 9/2017 | Yamaji et al. | |
| 2017/0269525 | A1 | 9/2017 | Okamoto et al. | |
| 2017/0269526 | A1 | 9/2017 | Yuasa et al. | |
| 2017/0357197 | A1 | 12/2017 | Okamoto et al. | |
| 2018/0081309 | A1 | 3/2018 | Hirose et al. | |
| 2018/0299809 | A1 | 10/2018 | Saitoh et al. | |

FOREIGN PATENT DOCUMENTS

| | | |
|---|---|---|
| JP | 2014-178636 | 9/2014 |
| JP | 2019-177701 | 10/2019 |

* cited by examiner

*Primary Examiner* — Bradley W Thies
(74) *Attorney, Agent, or Firm* — XSENSUS LLP

(57) ABSTRACT

A heating device includes a heater and a heating range variable member. The heater heats an object to which a liquid is applied. The object is conveyed in a conveyance direction. The heating range variable member changes a heating range of the heater in a width direction of the object. The width direction is orthogonal to the conveyance direction.

12 Claims, 8 Drawing Sheets

HEATING DEVICE AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2021-166828, filed on Oct. 11, 2021, in the Japan Patent Office, the entire disclosure of which is hereby incorporated by reference herein.

BACKGROUND

Technical Field

Embodiments of the present disclosure relate to a heating device and a liquid discharge apparatus.

Related Art

An inkjet image forming apparatus as a liquid discharge apparatus discharges ink onto a sheet such as paper to form an image. The inkjet image forming apparatus may include a heating device that heats the sheet to dry the ink discharged onto the sheet.

SUMMARY

Embodiments of the present disclosure describe an improved heating device that includes a heater and a heating range variable member. The heater heats an object to which a liquid is applied. The object is conveyed in a conveyance direction. The heating range variable member changes a heating range of the heater in a width direction of the object. The width direction is orthogonal to the conveyance direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
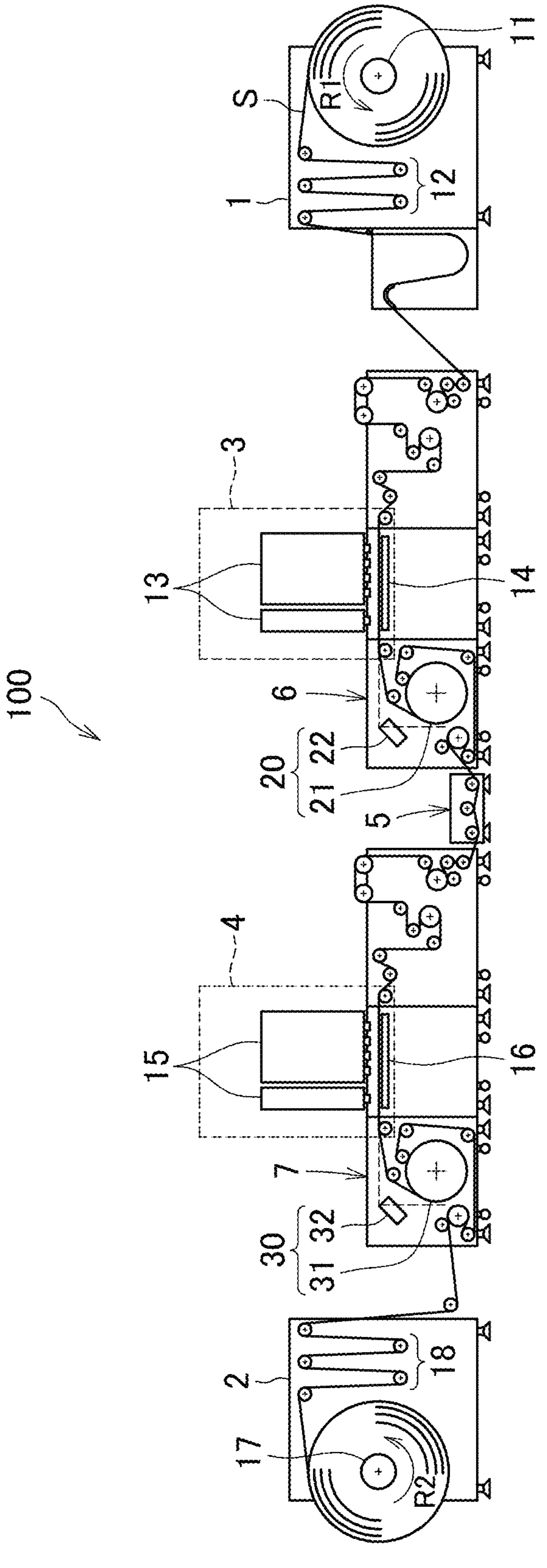
FIG. 1 is a schematic view illustrating an overall configuration of an inkjet image forming apparatus according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings for illustrating embodiments of the present disclosure, elements or components identical or similar in function or shape are given identical reference numerals as far as distinguishable, and redundant descriptions are omitted.

Figure 2:
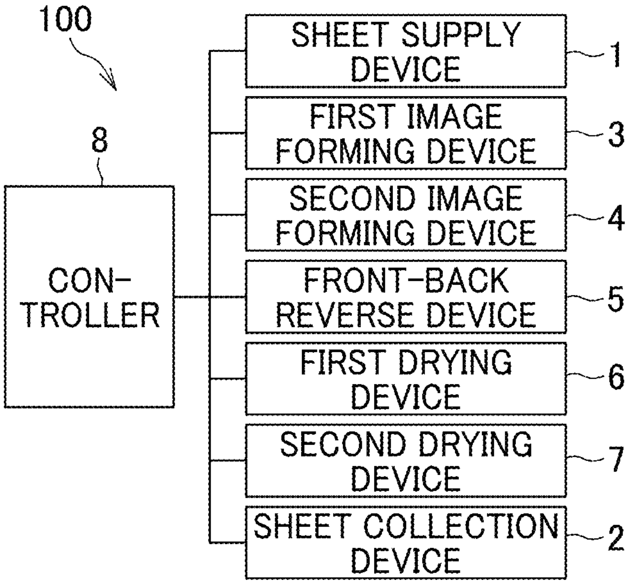
FIG. 2 is a block diagram of a control system of the inkjet image forming apparatus according to the present embodiments.

First, a configuration of an inkjet image forming apparatus 100, which is an example of a liquid discharge apparatus according to an embodiment of the present disclosure, is described with reference to FIGS. 1 and 2. FIG. 1 is a schematic view illustrating an overall configuration of the inkjet image forming apparatus 100. FIG. 2 is a block diagram of a control system of the inkjet image forming apparatus 100.

As illustrated in FIG. 1, the image forming apparatus 100 according to the present embodiment includes a sheet supply device 1 that supplies a sheet S for image formation, a first image forming device 3 that forms an image on a front surface of the sheet S, a second image forming device 4 that forms an image on a back surface of the sheet S, a front-back reverse device 5 that reverses the front and back surfaces of the sheet S, a first drying device 6 and a second drying device 7 that dry the sheet S, and a sheet collection device 2 that collects the sheet S on which an image is formed. The image forming apparatus 100 according to the present embodiment further includes a controller 8 (see FIG. 2) that controls the sheet supply device 1, the first image forming device 3, the second image forming device 4, the front-back reverse device 5, the first drying device 6, the second drying device 7, and the sheet collection device 2.

The sheet supply device 1 includes a supply roller 11 around which the long sheet S is wound in a roll shape, and a tension adjustment mechanism 12 that adjusts tension applied to the sheet S. The supply roller 11 is rotatable in the direction indicated by arrow R1 illustrated in FIG. 1 and feeds the sheet S while rotating. The tension adjustment mechanism 12 includes multiple rollers between which the sheet S is stretched to apply tension to the sheet S. Some of the multiple rollers move to adjust the tension of the sheet S, and the sheet S is fed from the supply roller 11 with a constant tension.

The first image forming device 3 includes a discharge head 13 as a liquid discharge unit that discharges ink (liquid) onto the sheet S, and a platen 14 as a sheet support that supports the sheet S being conveyed. The platen 14 faces the discharge head 13 and supports the lower surface (back surface) of the sheet S supplied from the sheet supply device 1. The discharge head 13 discharges ink onto the front surface of the sheet S based on image data to be formed on the front surface of the sheet S among the image data generated by the controller 8 to form an image on the sheet S. Here, the ink is a liquid containing a colorant, a solvent, and crystalline resin particles dispersed in the solvent. The crystalline resin changes a phase thereof and melts from a crystal to a liquid when heated above the melting point. The platen 14 approaches and separates from the discharge head 13 so as to keep the distance between the discharge head 13 and the sheet S constant.

The first drying device 6 includes a heating device 20 that heats the sheet S to dry ink on the sheet S. The heating device 20 includes a heating drum 21 that contacts the sheet S to heat the sheet S (i.e., a contact heater), and a hot air blower 22 that heats the sheet S in a non-contact manner (i.e., a non-contact heater). The heating drum 21 has a cylindrical shape and rotates while the sheet S is wound around the outer circumferential surface thereof, and a heating source such as a halogen heater is disposed inside the heating drum 21. The hot air blower 22 generates hot air to be blown onto the sheet S. The hot air blower 22 includes a heat generator such as a heater and an air blowing device such as a fan that blows hot air heated by the heat generator toward a conveyance path of the sheet S.

As illustrated in FIG. 1, the heating drum 21 faces the back surface of the sheet S conveyed in the conveyance path. When the sheet S is conveyed from the first image forming device 3, the back surface of the sheet S contacts the outer circumferential surface of the heating drum 21, and the sheet S is conveyed while being heated by the rotating heating drum 21. At that time, the rotation speed of the heating drum 21 is set to substantially the same speed as the conveyance speed of conveyance devices such as the sheet supply device 1, the sheet collection device 2, and conveyance rollers of the image forming apparatus 100. As a result, the sheet S is conveyed without slipping on the outer circumferential surface of the heating drum 21 in a conveyance direction of the sheet S (i.e., a sheet conveyance direction).

The hot air blower 22 faces the front surface of the sheet S on the heating drum 21. When the sheet S is conveyed from the first image forming device 3, both the front and back surfaces of the sheet S are heated by the heat from the heating drum 21 and the hot air from the hot air blower 22 to dry ink applied onto the front surface of the sheet S.

A known device that reverses the front surface and the back surface of the sheet S can be used as the front-back reverse device 5. When the sheet S conveyed from the first drying device 6 passes through the front-back reverse device 5, the front and back surfaces of the sheet S are reversed, and then the reversed sheet S is sent to the second image forming device 4. That is, the sheet S is conveyed with the front surface facing upward, reversed by the front-back reverse device 5, and conveyed with the front surface facing downward (with the back surface facing upward).

The second image forming device 4 has basically the same configuration as the first image forming device 3. The second image forming device 4 includes a discharge head 15 that discharges ink and a platen 16 that supports the sheet S. The second image forming device 4 forms an image on the back surface of the sheet S. That is, since the sheet S is conveyed to the second image forming device 4 after the front and back surfaces of the sheet S is reversed by the front-back reverse device 5, the discharge head 15 of the second image forming device 4 discharges ink onto the back surface of the sheet S based on image data to be formed on the back surface of the sheet S among the image data generated by the controller 8 to form an image on the sheet S.

The second drying device 7 includes a heating device 30 having the same configuration as the heating device 20 of the first drying device 6. That is, the heating device 30 of the second drying device 7 includes a heating drum 31 serving as the contact heater and a hot air blower 32 serving as the non-contact heater. As illustrated in FIG. 1, similarly to the heating drum 21 of the first drying device 6, the heating drum 31 of the second drying device 7 faces the surface of the sheet S conveyed in the conveyance path. Since the front surface and the back surface of the sheet S is reversed, the front surface of the sheet S contacts the outer circumferential surface of the heating drum 31. At that time, even if an image is formed (ink is applied) on the front surface of the sheet S, the ink has already been dried by the first drying device 6 when the heating drum 31 contacts the image on the front surface. As a result, the image does not deteriorate. The hot air blower 32 of the second drying device 7 faces the back surface of the sheet S on the heating drum 31. Accordingly, the hot air blower 32 blows hot air toward the sheet S, thereby mainly heating the back surface of the sheet S. As a result, the ink on the back surface of the sheet S is effectively dried, and the ink on the front surface of the sheet S is further dried.

The sheet collection device 2 includes a collection roller 17 that winds and collects the sheet S, and a tension adjustment mechanism 18 that adjusts tension applied to the sheet S. The collection roller 17 is rotatable in the direction indicated by arrow R2 illustrated in FIG. 1 and winds the sheet S in a roll shape around the collection roller 17 while rotating. Similarly to the tension adjustment mechanism 12 of the sheet supply device 1, the tension adjustment mechanism 18 includes multiple rollers. Some of the multiple rollers move to adjust the tension of the sheet S, and the sheet S is wound around the collection roller 17 with a constant tension.

The controller 8 includes an information processor such as a personal computer (PC). The controller 8 generates image data to be formed on the front surface and the back surface of the sheet S, and controls various operations of the sheet supply device 1, the first image forming device 3, the second image forming device 4, the front-back reverse device 5, the first drying device 6, the second drying device 7, and the sheet collection device 2. For example, the controller 8 controls the temperatures of the heating drum 21 of the first drying device 6 and the heating drum 31 of the second drying device 7. The temperature of each of the heating drums 21 and 31 is preferably controlled to a temperature suitable for drying the ink on the sheet S and lower than the melting point of the resin contained in the ink so that the resin in the ink does not melt (i.e., a first temperature). The ink is less likely to be peeled off from a certain type of sheet S. When such a sheet S is used, the temperature of the heating drum 31 of the second drying device 7 may be set to a high temperature (i.e., a second temperature) equal to or higher than the melting point of the resin in addition to the temperature (i.e., the first temperature) lower than the melting point of the resin. The heating drum 31 controlled to the high temperature (second temperature) dries the ink on the sheet S faster and improve productivity of images.

In the image forming apparatus according to the embodiment of the present disclosure, not only one type of sheet but also a plurality of types of sheets having different width sizes can be conveyed. In such an image forming apparatus that conveys various types of sheets, if a heating device (drying device) has a constant heating range to heat a sheet, a sheet having a small width conveyed on the heating drum hardly draws heat from the heating drum in a non-passage area through which the sheet does not pass, and thus the temperature of the heating drum in the non-passage area is likely to rise. For this reason, the heating drum may be deteriorated by heat or may unevenly heat a sheet due to a temperature difference of the surface thereof (i.e., uneven heating). Accordingly, image quality may be deteriorated by the uneven heating.

Similarly to the above-described embodiment, when the hot air blower faces the heating drum, and hot air that is not blown onto the sheet is blown onto the heating drum, and thus the temperature of the heating drum in the non-passage area through which the sheet does not pass is more likely to rise. When a long sheet is conveyed on the heating drum, as compared with a so-called cut sheet which is cut into a predetermined length, the long sheet passing on the heating drum continuously draws heat from the heating drum in a passage area, causing uneven temperature distribution, and thus the temperature of the beating drum in the non-passage area through which the sheet does not pass is more likely to rise.

Therefore, in the embodiment of the present disclosure, the following configuration is adopted to prevent the above-described adverse effect. The configuration of the heating device (drying device) according to the present embodiment is described below in detail.

Figure 3:
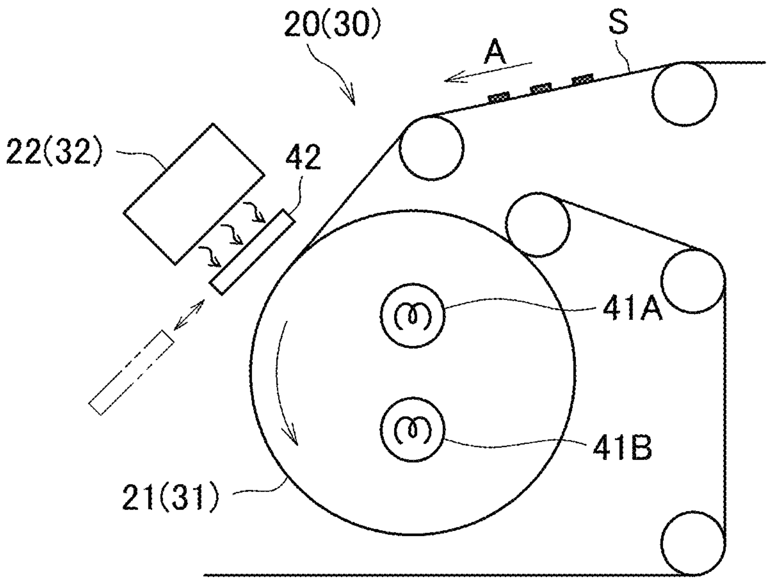
FIG. 3 is a side view of a heating device according to a first embodiment of the present disclosure as viewed in a sheet width direction.
Figure 4:
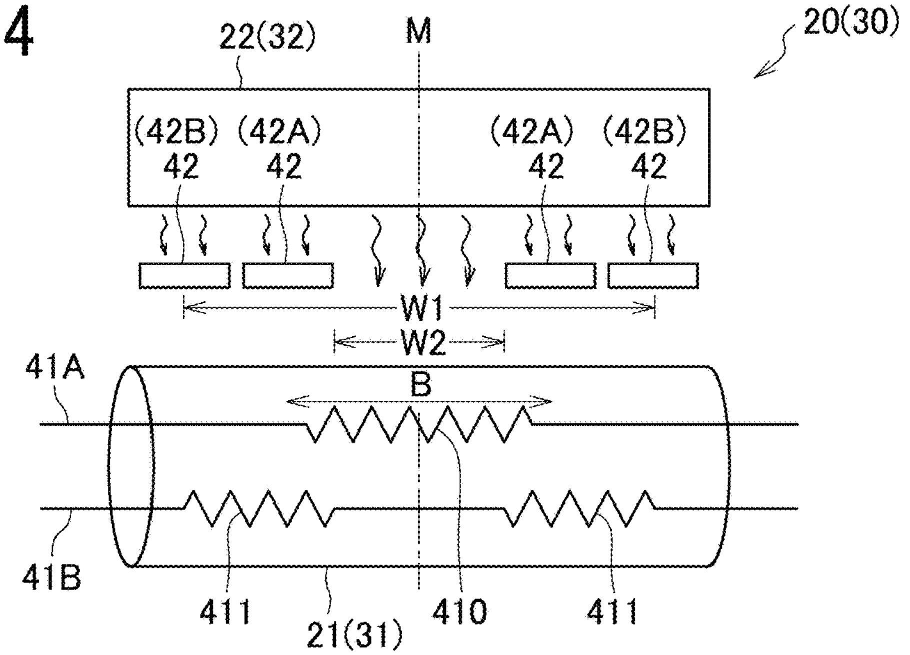
FIG. 4 is a front view of the heating device according to the first embodiment of the present disclosure as viewed in the sheet conveyance direction.

FIG. 3 is a side view of the heating device 20 or 30 according to a first embodiment of the present disclosure as viewed in a width direction of the sheet S (i.e., a sheet width direction). FIG. 4 is a front view of the heating device 20 or 30 as viewed in the sheet conveyance direction. Since the configurations of the heating devices 20 and 30 of the first drying device 6 and the second drying device 7 are basically the same, only the configuration of one heating device 20 is described, and the description of the configuration of the other heating device 30 is omitted.

The sheet S is conveyed in the "sheet conveyance direction" indicated by arrow A in FIG. 3, for example. The "sheet width direction" is parallel to a conveyance surface on which the sheet S is conveyed and orthogonal to the sheet conveyance direction as indicated by arrow B in FIG. 4. The sheet S being conveyed passes on the "conveyance surface." For example, when the sheet S is stretched and conveyed between multiple conveyance rollers, an imaginary surface connecting contact portions between the multiple conveyance rollers and the sheet S is defined as the conveyance surface, and when the sheet S is conveyed on a conveyance belt, the surface of the conveyance belt on which the sheet S is placed is defined as the conveyance surface. The "sheet conveyance direction A," the "sheet width direction B," and the "conveyance surface" in the following description have the same meaning defined as described above, respectively.

As illustrated in FIGS. 3 and 4, the heating device 20 according to the present embodiment includes multiple halogen heaters 41A and 41B as heating sources that heat the heating drum 21 from the inside thereof. In the present embodiment, two halogen heaters 41A and 41B generate heat in different ranges from each other in the sheet width direction B (see FIG. 4).

In the present embodiment, among the two halogen heaters 41A and 41B, the upper halogen heater 41A in FIG. 4 has a heat generating portion 410 in a center region including a center M of a maximum passage area (maximum passage width) W1, through which a maximum-width sheet passes, of the heating drum 21. Accordingly, the heat generating portion 410 of the upper halogen heater 41A generates heat to mainly heat the center region of the heating drum 31. In the present embodiment, the heat generating portion 410 of the upper halogen heater 41A is disposed over at least a minimum passage area (minimum passage width) W2 through which a minimum-width sheet passes. However, a region (width) of the heat generating portion 410 may be appropriately changed as long as the range includes the center M.

The lower halogen heater 41B in FIG. 4 has a pair of heat generating portions 411 disposed outboard of the heat generating portion 410 of the upper halogen heater 41A (i.e., at positions separated from the center M in the sheet width direction B). Accordingly, the heat generating portions 411 in the lower halogen heater 41B generate heat to mainly heat both end regions of the heating drum 31.

The heating device 20 according to the present embodiment further includes shields 42 that are movable to a position between the conveyance path (conveyance surface) on which the sheet S is conveyed and the hot air blower 22. The shield 42 interposed between the conveyance path and the hot air blower 22 blocks the hot air blown from the hot air blower 22. It should be noted that the term "block the hot air" as used herein includes not only a case of completely blocking the hot air blown from the hot air blower 22 but also a case of blocking only a part of the hot air.

As illustrated in FIG. 3, the shield 42 is movable in the sheet conveyance direction A and a direction opposite to the sheet conveyance direction A. Accordingly, the shield 42 is movable between a shielding position (a position depicted by a solid line in FIG. 3) at which the shield 42 is interposed between the conveyance path and the hot air blower 22 to block the hot air and a retracted position (a position depicted by a long dashed double-short dashed line in FIG. 3)

retracted from the shielding position. The moving direction of the shield 42 is not limited to the sheet conveyance direction A and the direction opposite to the sheet conveyance direction A as illustrated in FIG. 3, and may be the sheet width direction B or other directions. The material of the shield 42 is not particularly limited as long as the material has heat resistance to some extent and can block the hot air.

As illustrated in FIG. 4, multiple shields 42 are arranged in the sheet width direction B. In the present embodiment, two shields 42 (42A and 42B) are disposed in each end region (regions on both ends not including the center M) of the heating device 20, outboard of the minimum passage area W2 through which the minimum-width sheet passes. In the present embodiment, among the four shields 42, two shields 42A on the inner side, which are closer to the center M, move together, and two shields 42B on the outer side, which are farther from the center M, move together. Note that each shield 42 may be movable independently of each other.

Figure 5:
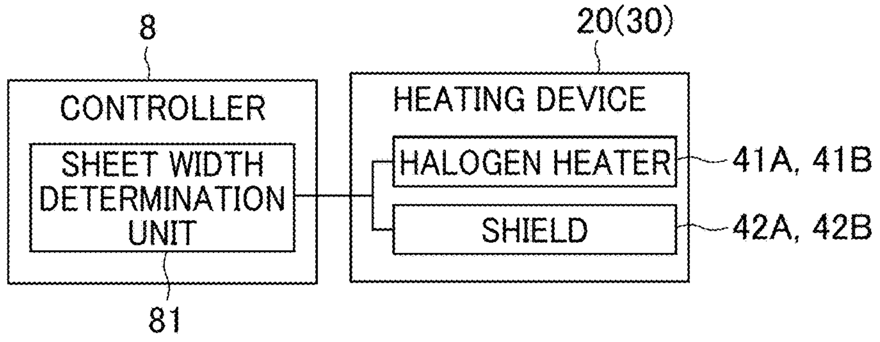
FIG. 5 is a block diagram of a control system of the heating device according to the first embodiment of the present disclosure.

FIG. 5 is a block diagram of a control system of the heating device 20 or 30 according to the first embodiment of the present disclosure.

As illustrated in FIG. 5, the controller 8 according to the present embodiment includes a sheet width determination unit 81 that determines a width (size in the width direction B) of the sheet. For example, the sheet width determination unit 81 may store data of the width of each type of sheet in advance and determine the width of sheet in accordance with the selected type of sheet, or may determine the width of sheet based on data obtained from a sensor that detects the width of the selected sheet. The controller 8 controls the halogen heaters 41A and 41B and the shields 42A and 42B of the heating device 20 in response to the width of sheet determined by the sheet width determination unit 81. That is, the controller 8 serves as a heating range variable member that causes the halogen heaters 41A and 41B to turn on or off to change a heating range of the contact heater, and the controller 8 and the shields 42A and 42B construct a heating range variable member to change a heating range of the non-contact heater The operation and control of the heating device 20 or 30 according to the present embodiment is described below.

Figure 6:
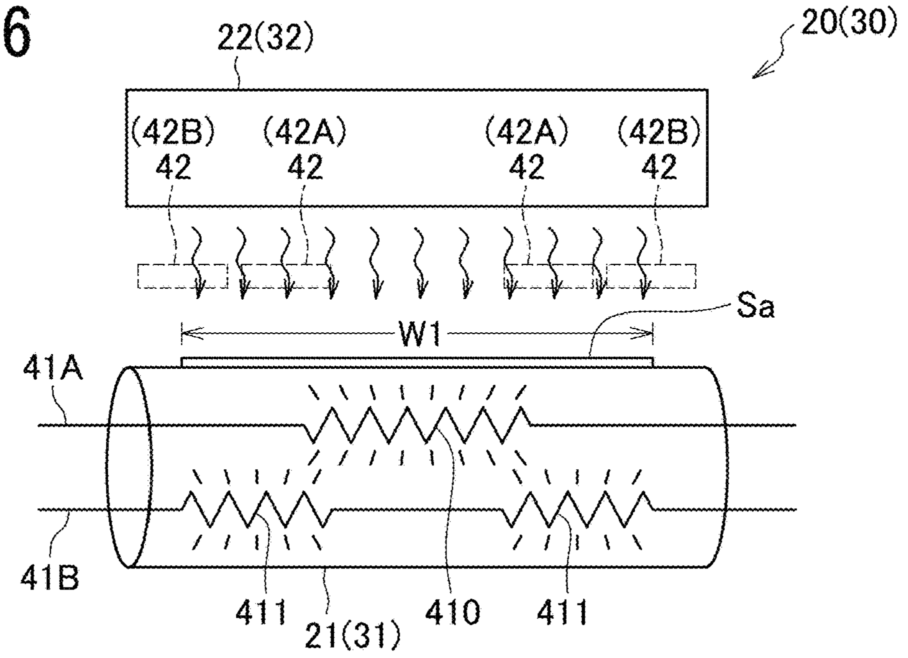
FIG. 6 is a schematic view of the heating device that heats a maximum-width sheet being conveyed.

As illustrated in FIG. 6, when a maximum-width sheet Sa is conveyed, both the halogen heaters 41A and 41B generate heat (turn on). Accordingly, the entire maximum passage area W1 of the heating drum 21 through which the maximum-width sheet Sa passes is uniformly heated. In this case, all of the shields 42A and 42B are disposed at the retracted position. Accordingly, the hot air of the hot air blower 22 is blown onto the conveyance path without being blocked over the entire maximum passage area W1 through which the maximum-width sheet Sa passes. As a result, when the maximum-width sheet Sa is conveyed to the heating device 20, the entire maximum-width sheet Sa is heated by the heat of the heating drum 21 and the hot air of the hot air blower 22 in the sheet width direction.

Figure 7:
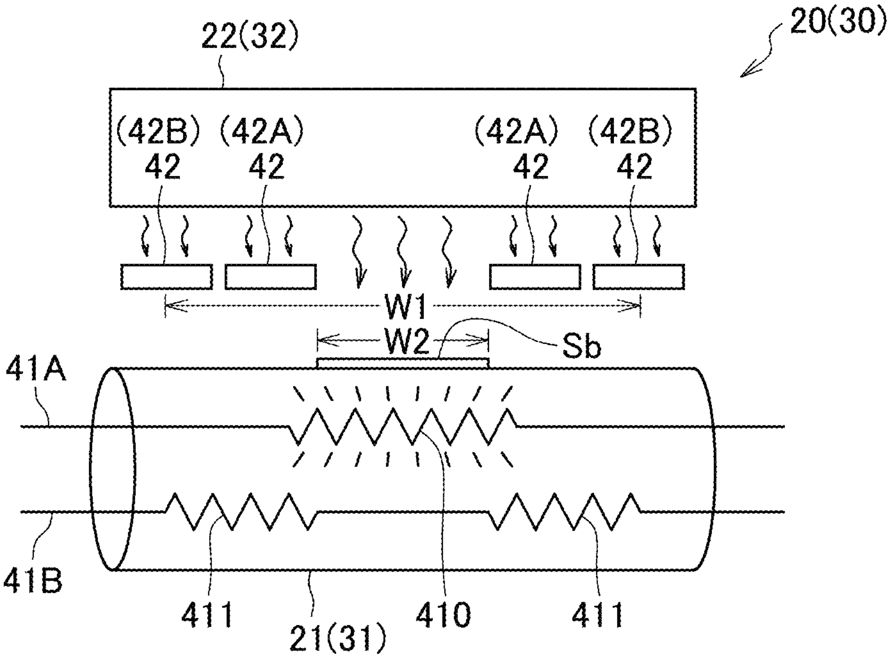
FIG. 7 is a schematic view of the heating device that heats a minimum-width sheet being conveyed.

On the other hand, as illustrated in FIG. 7, when a minimum-width sheet Sb is conveyed, only the halogen heater 41A having the heat generating portion 410 in the center region generates heat (turns on) among the two halogen heaters 41B and 41A. Accordingly, the center region of the heating drum 21 through which the minimum-width sheet Sb passes is mainly heated. In this case, each of the shields 42A and 42B moves to the shielding position between the hot air blower 22 and the conveyance path. Accordingly, a part of the hot air blown from the hot air blower 22, which is outside the minimum passage area W2, is blocked. Since the hot air is not blocked inside the minimum passage area W2, the hot air is blown onto the minimum-width sheet Sb. As a result, in this case, when the minimum-width sheet Sb is conveyed to the heating device 20, the entire minimum-width sheet Sb is heated by the heat of the heating drum 21 and the hot air of the hot air blower 22 in the sheet width direction.

Figure 8:
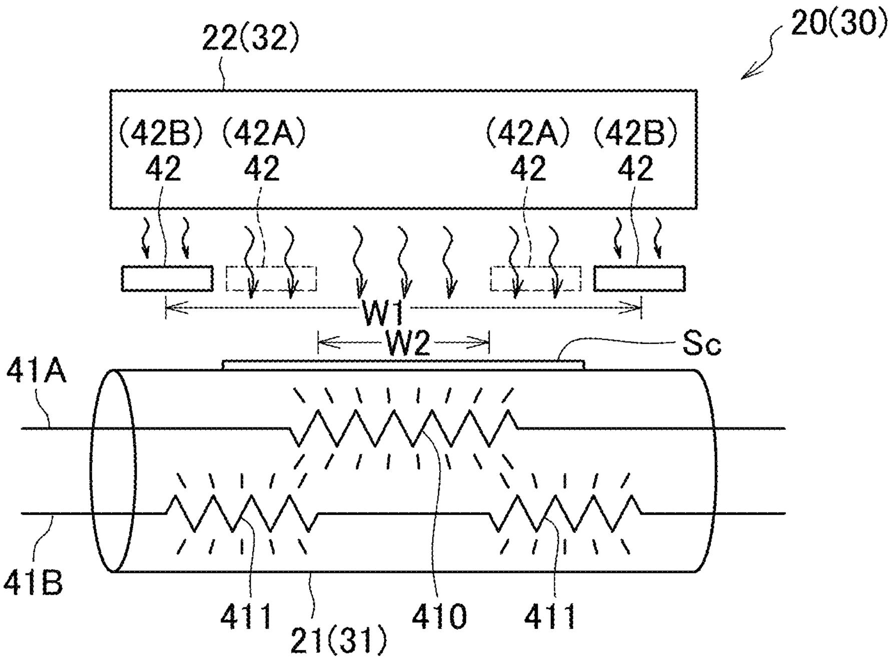
FIG. 8 is a schematic view of the heating device that heats a middle-width sheet being conveyed.

Further, as illustrated in FIG. 8, when a middle-width sheet Sc having a width between the maximum width and the minimum width is conveyed, both the halogen heaters 41A and 41B generate heat (turn on), and only the outer two shields 42B among the four shields 42A and 42B are disposed at the shielding position. In this case, the heating drum 21 is heated and the hot air blown from the hot air blower 22 is not blocked in a passage area through which the middle-width sheet Sc passes. As a result, the entire middle-width sheet Sc is heated by the heat of the heating drum 21 and the hot air of the hot air blower 22 in the sheet width direction.

As described above, in the present embodiment, the controller 8 selects a halogen heater that generates heat among the halogen heaters 41A and 41B and a shield that moves to the shielding position among the shields 42A and 42B in response to the width of the sheet being conveyed to cause the heating device 20 to change the heating range in the sheet width direction. In particular, when the minimum-width sheet Sb is conveyed as illustrated in FIG. 7, the heating device 20 narrows the heating range, that is, a range of the heating drum 21 heated by the halogen heaters 41A and 41B and a range of the conveyance path onto which the hot air is blown from the hot air blower 22, thereby preventing the temperature of the heating drum 21 in the non-passage area through which the minimum-width sheet Sb does not pass from excessively rising (i.e., preventing an excessive temperature rise). Accordingly, the deterioration of the heating drum 21 and the uneven heating of the sheet caused by the temperature difference of the heating drum 21 can be prevented, and the durability of the heating drum 21 and image quality can be improved. Further, the halogen heaters 41A and 41B do not unnecessarily generate heat, thereby saving energy.

In the present embodiment described above, the heating range of the heating drum 21 can be changed to either a range corresponding to the maximum passage area W1 or a range corresponding to the minimum passage area W2. In another embodiment, another halogen heater may be added inside the heating drum 21 so that a heating range corresponding to the passage area through which the middle-width sheet Sc passes can also be selected in addition to the above-described ranges. In addition, the number of the shields 42 may be increased so as to correspond to more kinds of widths of sheet.

A second embodiment of the present disclosure is described below with reference to FIG. 9. In the configuration of the second embodiment, a description of the same portions as the configuration of the above-described embodiment (first embodiment) is omitted, and different portions are described.

Figure 9:
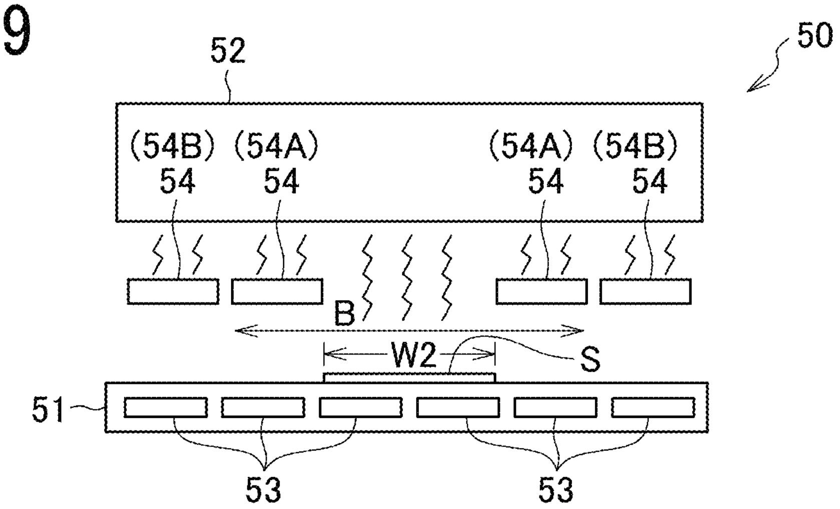
FIG. 9 is a front view of a heating device according to a second embodiment of the present disclosure as viewed in the sheet conveyance direction.

As illustrated in FIG. 9, in the present embodiment, the configurations of the contact heater and the non-contact heater included in a heating device 50 are different from the above-described embodiment. The other configurations are the same as in the above-described embodiment. Specifically, the heating device 50 according to the present embodiment includes a plate-shaped heating plate 51 instead of the heating drum 21 as the contact heater and a high-frequency dielectric heating unit 52 instead of the hot air blower 22 as the non-contact heater.

The heating plate 51 is a plate-shaped member including multiple heaters 53 therein as the heating sources. The heating plate 51 is disposed so as to contact the sheet S. On the other hand, the high-frequency dielectric heating unit 52 is disposed at a position not in contact with the sheet S, and emits high-frequency waves having a predetermined wavelength to the sheet S to cause a heating effect on the sheet S, thereby heating the sheet S. Since the intensity of the heating effect depends on the material of the object to be heated, the preferable wavelength of the high-frequency waves emitted from the high-frequency dielectric heating unit 52 is selected in accordance with the material of the sheet S.

The multiple heaters 53 are arranged side by side in the sheet width direction B in the heating plate 51 and generate heat independently of each other. Accordingly, the controller 8 selects the heater 53 to generate heat among the multiple heaters 53 to causes the heating plate 51 to change the heating range in the sheet width direction B.

The heating device 50 further includes multiple shields 54A and 54B between the high-frequency dielectric heating unit 52 and the conveyance path (conveyance surface). The multiple shields 54A and 54B are movable and block the high-frequency waves emitted from the high-frequency dielectric heating unit 52. Each of the shields 54A and 54B moves between the shielding position interposed between the high-frequency dielectric heating unit 52 and the conveyance path and the retracted position retreated from the shielding position. The shields 54A and 54B are partially interposed between the high-frequency dielectric heating unit 52 and the conveyance path in the sheet width direction B (in FIG. 9, a range on both outer sides excluding the minimum passage area W2). The shields 54A and 54B are made of, for example, a metallic material. Other materials that block high-frequency waves can be used for the shields 54A and 54B.

As described above, in the present embodiment, the multiple heaters 53 generate heat independently of each other to heat the heating plate 51. The controller 8 selects the heater 53 among the multiple heaters 53 in response to the width of the sheet being conveyed to cause the heating plate 51 to change the heating range thereof. That is, when a sheet having a width smaller than the maximum width is conveyed, only some of the heaters 53 among the multiple heaters 53 generate heat in response to the width of the sheet. Accordingly, the temperature of the heating plate 51 in the non-passage area through which the sheet does not pass is prevented from excessively rising. As a result, similarly to the above-described embodiment (first embodiment), the durability of the heating plate 51 and image quality can be improved. Further, the heaters 53 of the heating plate 51 do not unnecessarily generate beat, thereby saving energy. On the other hand, when the maximum-width sheet is conveyed, all the heaters 53 generate heat to uniformly heat the maximum-width sheet.

Each of the shields 54A and 54B moves to the shielding position or the retracted position in response to the width of the sheet being conveyed to allow the high-frequency dielectric heating unit 52 to irradiate mainly the passage area through which the sheet passes with the high-frequency waves. As a result, the heating plate 51 in the non-passage area through which the sheet does not pass is not irradiated with the high-frequency waves, thereby preventing the temperature of the heating plate 51 from excessively rising. In addition, the high-frequency dielectric heating unit 52 is prevented from irradiating unnecessary portions with the high-frequency waves, thereby reducing adverse effects due to the high-frequency waves emitted to the surrounding.

The following embodiments of the present disclosure are different from the first embodiment in the control system that mainly controls the heating device. Since the basic configuration of each embodiment is the same as that of the above-described embodiment, the difference in the control system is described.

Figure 10:
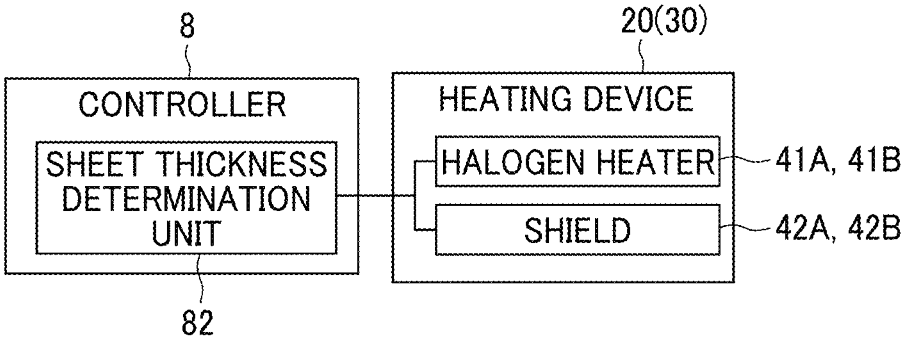
FIG. 10 is a block diagram of a control system of the heating device according to a third embodiment of the present disclosure.

FIG. 10 is a block diagram of a control system of the heating device 20 or 30 according to a third embodiment of the present disclosure.

In the embodiment illustrated in FIG. 10, the controller 8 includes a sheet thickness determination unit 82 that determines a thickness in a height direction orthogonal to each of the conveyance direction and the width direction (size in a direction orthogonal to the conveyance surface) of the sheet. For example, the sheet thickness determination unit 82 may store data of the thickness of each type of sheet in advance and determine the thickness of sheet in accordance with the selected type of sheet, or may determine the thickness of sheet based on data obtained from a sensor that detects the thickness of the selected sheet. In the present embodiment, the controller 8 controls the halogen heaters 41A and 41B and the shields 42A and 42B of the heating device 20 in response to the thickness of sheet determined by the sheet thickness determination unit 82.

In general, a thick sheet has a larger heat capacity than a thin sheet even if the sheet has the same width, and requires more heat for drying the ink than the thin sheet. Therefore, a set temperature (target heating temperature) of the halogen heater for heating the heating drum may be set to be higher. However, when the set temperature of the halogen heater is set to be high, an amount of heat accumulated in the heating drum in the non-passage area through which the sheet does not pass increases, causing the temperature of the heating drum 21 to excessively rise. Therefore, when the sheet is thick even if the width of the sheet is the same, the heating range of the heating drum is preferably controlled (limited) so that the temperature of the heating drum does not excessively rise.

Figure 11:
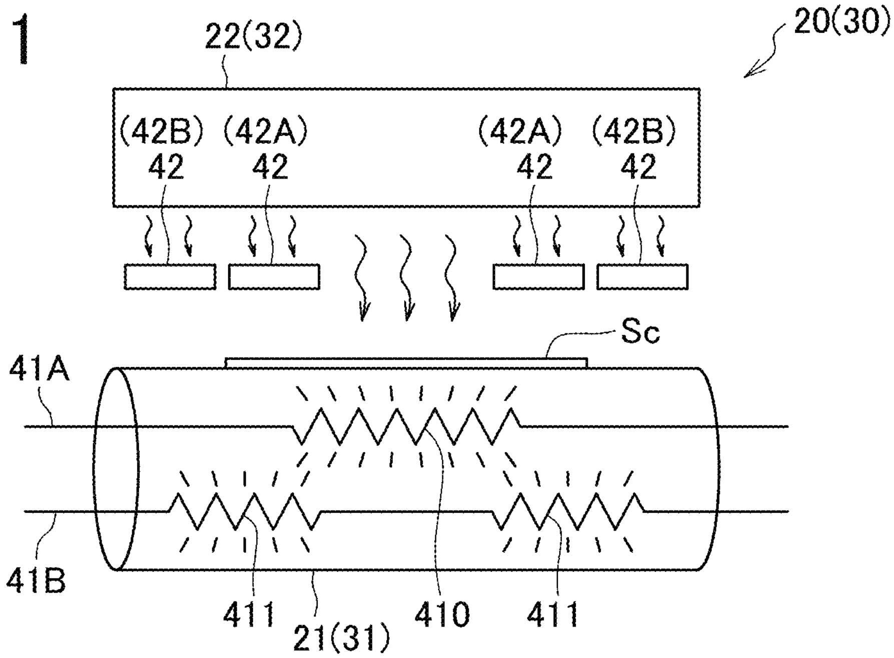
FIG. 11 is a schematic view illustrating an example of an operation of the heating device according to the third embodiment of the present disclosure.

For example, in the first embodiment, when the middle-width sheet Sc is conveyed, as illustrated in FIG. 8, both the halogen heaters 41A and 41B generate heat, and the inner two shields 42A are disposed at the retracted position, so that hot air is blown to the entire middle-width sheet Sc. When the thick middle-width sheet Sc is conveyed, as illustrated in FIG. 11, the heating range is preferably limited. That is, in the example illustrated in FIG. 11, the two inner shields 42A move to the shielding position in addition to the two outer shields 42B to narrow the blowing range of the hot air blown to the thick middle-width sheet Sc and the heating drum 21. Accordingly, the amount of heat accumulated in the heating drum 21 due to the hot air is reduced, thereby preventing the temperature of the heating drum 21 in the non-passage area through which the thick middle-width sheet Sc does not pass from excessively rising.

Figure 12:
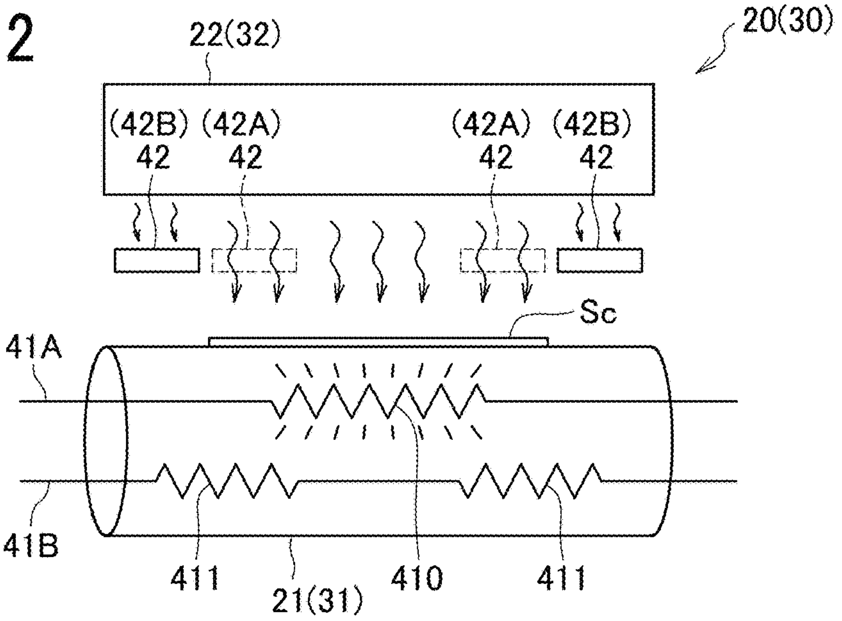
FIG. 12 is a schematic view illustrating another example of the operation of the heating device according to the third embodiment of the present disclosure.

Alternatively, as in the example illustrated in FIG. 12, a heat generation range of the halogen heaters 41A and 41B may be limited without narrowing the blowing range to prevent the temperature of the heating drum 21 in the non-passage area from excessively rising. That is, only the halogen heater 41A having the heat generating portion 410 in the center region generates heat. Both the blowing range of the hot air and the heat generation range of the halogen heater may be controlled in response to the thickness of the sheet to adjust the heating range of the heating device 20. As described above, the heating range of at least one of the contact heater or the non-contact heater is adjusted in response to the thickness of the sheet, thereby preventing the excessive temperature rise of the contact heater and the influence of unnecessary heat on the surroundings.

Figure 13:
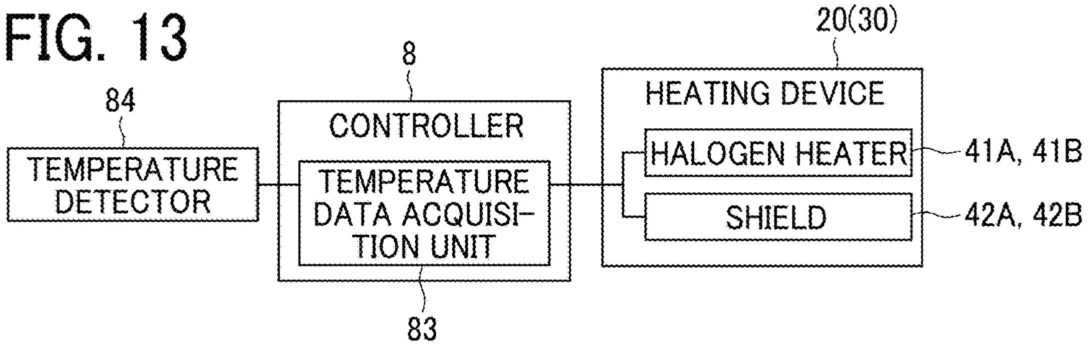
FIG. 13 is a block diagram of a control system of the heating device according to a fourth embodiment of the present disclosure.

FIG. 13 is a block diagram of a control system of the heating device 20 or 30 according to a fourth embodiment of the present disclosure.

In the embodiment illustrated in FIG. 13, the controller 8 includes a temperature data acquisition unit 83 that acquires data of an environmental temperature detected by a temperature detector 84 such as a temperature sensor. The environmental temperature detected by the temperature detector 84 may be the ambient temperature around the image forming apparatus 100 or the temperature of the sheet. The controller 8 controls the halogen heaters 41A and 41B and the shields 42A and 42B of the heating device 20 in response to the environmental temperature detected by the temperature detector 84.

When the environmental temperature is low, the temperature of the sheet also decreases with the environmental temperature. For this reason, a large amount of heat applied to the sheet is required to effectively dry ink on the sheet as compared with a case where the environmental temperature is high. Therefore, even if the sheet is the same type (the same width, the same thickness, and the same material), when the environmental temperature is low, the amount of heat applied to the sheet is preferably increased.

Figure 14:
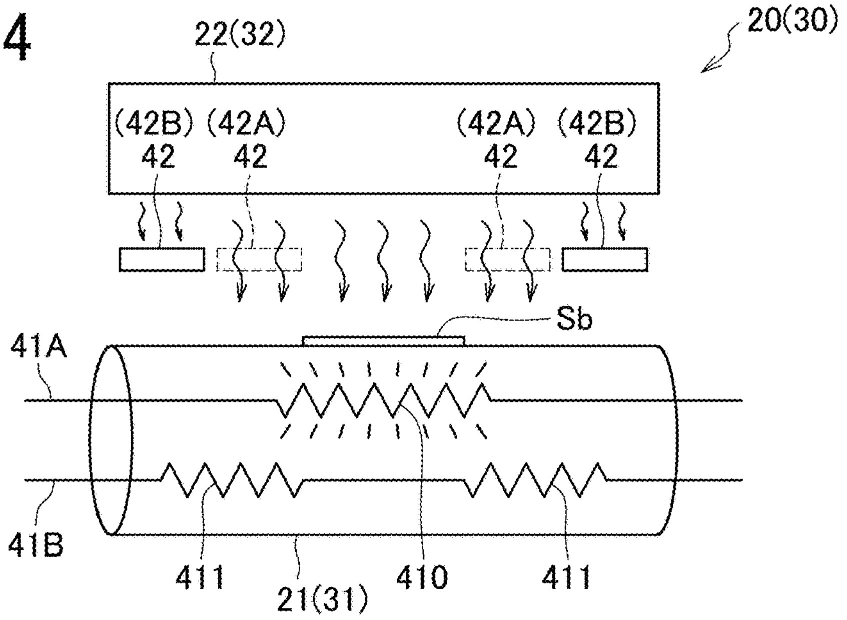
FIG. 14 is a schematic view illustrating an example of an operation of the heating device according to the fourth embodiment of the present disclosure.

For example, in the first embodiment, when the minimum-width sheet Sb is conveyed, as illustrated in FIG. 7, only the halogen heater 41A having the heat generating portion 410 in the center region generates heat, and all the shields 42A and 42B are disposed at the shielding position to limit the heating range. When the environmental temperature is low, as illustrated in FIG. 14, the heating range is preferably widened even if the minimum-width sheet Sb is used. That is, in the example illustrated in FIG. 14, the two inner shields 42A move to the retracted position to widen the blowing range of the hot air blown to the minimum-width sheet Sb and the heating drum 21. Accordingly, the temperature or the amount of heat accumulated in the heating drum 21 is increased, and the minimum-width sheet Sb is effectively heated to dry ink on the minimum-width sheet Sb even if the environmental temperature is low.

Figure 15:
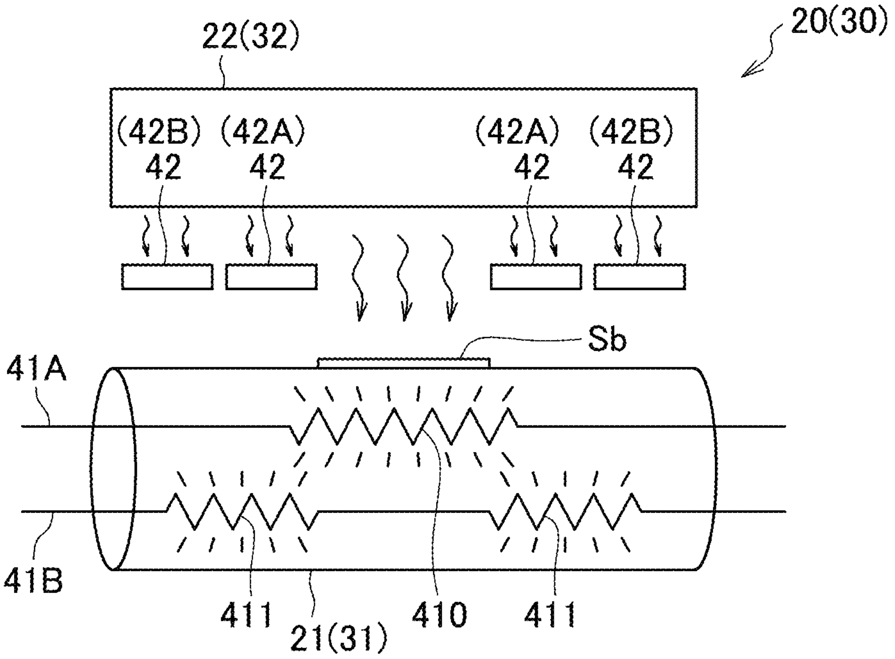
FIG. 15 is a schematic view illustrating another example of the operation of the heating device according to the fourth embodiment of the present disclosure.

Alternatively, as in the example illustrated in FIG. 15, the heat generation range of the halogen heaters 41A and 41B may be widened without widening the blowing range to increase the amount of heat accumulated in the heating drum 21. Both the blowing range of the hot air and the heat generation range of the halogen heater may be controlled in response to the environmental temperature to adjust the heating range of the heater. As described above, the heating range of at least one of the contact heater or the non-contact heater is adjusted in response to the environmental temperature, thereby effectively heating the sheet to dry ink faster.

Figure 16:
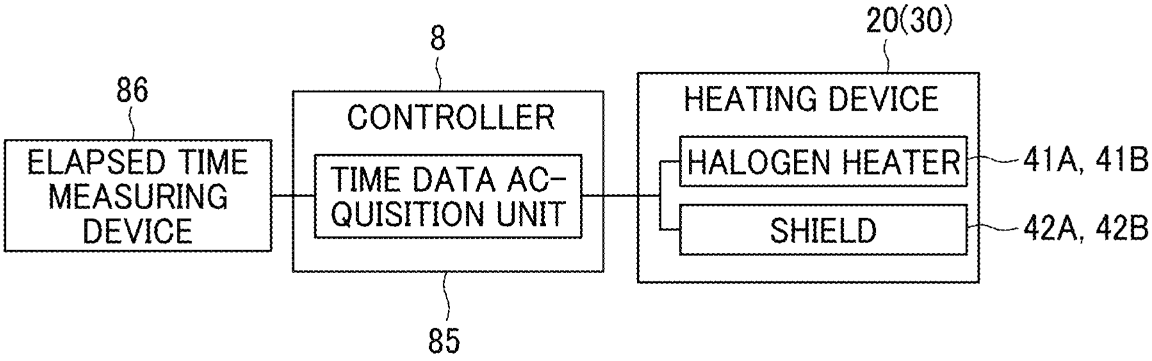
FIG. 16 is a block diagram of a control system of the heating device according to a fifth embodiment of the present disclosure.

FIG. 16 is a block diagram of a control system of the heating device 20 or 30 according to a fifth embodiment of the present disclosure.

In the embodiment illustrated in FIG. 16, the controller 8 includes a time data acquisition unit 85 that acquires data of an elapsed time measured by an elapsed time measuring device 86 such as a timer. Specifically, the elapsed time measuring device 86 measures an elapsed time after the contact heater such as the heating drum 21 or the non-contact heater such as the hot air blower 22 starts heating the sheet. When the contact heater and the non-contact heater simultaneously start heating the sheet, the elapsed time measuring device 86 starts measuring the elapsed time from a timing to start heating (i.e., a heating start timing). When the heating start timings of the contact heater and the non-contact heater are different from each other, the elapsed time measuring device 86 preferably measures the time from the heating start timing of the contact heater whose temperature locally rises. If the controller 8 can determine the heating start timing of the contact heater or the non-contact heater, the elapsed time measuring device 86 may measure the time from the timing before the heating start timing (for example, the timing at which the discharge head 13 starts discharging ink onto the sheet). The controller 8 controls the halogen heaters 41A and 41B and the shields 42A and 42B of the heating device 20 in response to the elapsed time measured by the elapsed time measuring device 86.

The above-described excessive temperature rise in the non-passage area does not occur immediately after the contact heater or the non-contact heater starts heating the sheet, but occurs due to an increase in the amount of heat locally accumulated in the contact heater after the sheets pass for a while. For this reason, the heating range may not be limited for a while after the contact heater starts heating the sheet.

In the present embodiment, the elapsed time measuring device 86 measures the time from when the contact heater starts heating the sheet. When the measured time reaches a preset time, the controller 8 causes the shields to move to the shielding position or selects the heaters to generate heat (see FIG. 7 or 8) to limit the heating range of at least one of the non-contact heater or the contact heater.

That is, the heating range is limited before the amount of heat is unevenly accumulated in the contact heater and the excessive temperature rise occurs to prevent the temperature rise of the contact heater. As described above, the heating range of the contact heater or the non-contact heater may be limited after a predetermined time elapses from when the contact heater starts heating the sheet.

Each of the different control systems is described in the above embodiments, and two, or three or more of the control systems of the respective embodiments may be appropriately combined and used in another embodiment. For example, the control system for controlling the heating range in response to the width of sheet as illustrated in FIG. 5 and the control system for controlling the heating range in response to the thickness of sheet as illustrated in FIG. 10 may be used in combination. Such a control system is not limited to the configuration including the heating drum 21 and the hot air blower 22 (e.g., the first embodiment), and can also be applied to the configuration including the heating plate 51 and the high-frequency dielectric heating unit 52 (e.g., the second embodiment).

The present disclosure is not limited to the above-described embodiments, and design changes can be appropriately made without departing from the scope of the disclosure.

In the above-described embodiments, the contact heater (e.g., the heating drum and the heating plate) and the non-contact heater (e.g., the hot air blower and the high-frequency dielectric heating unit) are disposed so as to face each other via the conveyance path as an example, but the relative position between the contact heater and the non-contact heater is not limited thereto.

Figure 17:
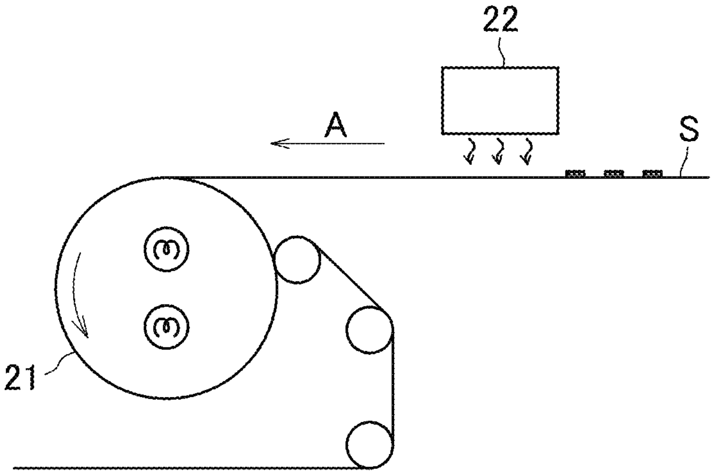
FIG. 17 is a schematic view illustrating another arrangement of a contact heater and a non-contact heater of the heating device.

For example, as illustrated in FIG. 17, the contact heater (in this case, the heating drum 21) and the non-contact heater (in this case, the hot air blower 22) may be disposed at different positions in the sheet conveyance direction A.

Figure 18:
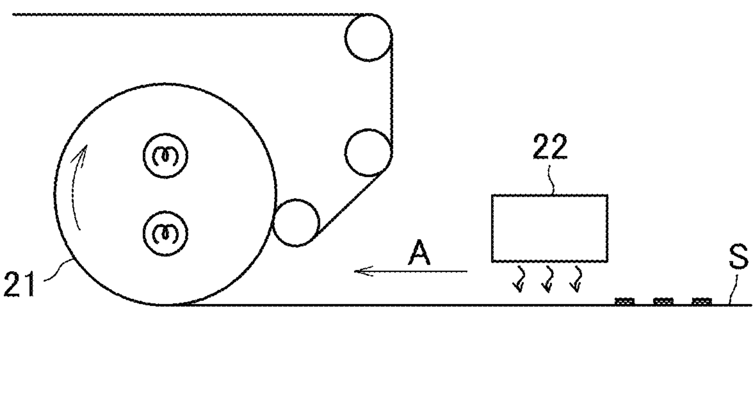
FIG. 18 is a schematic view illustrating yet another arrangement of the contact heater and the non-contact heater.

Further, as illustrated in FIG. 18, the contact heater (in this case, the heating drum 21) and the non-contact heater (in this case, the hot air blower 22) may be disposed on the same side with respect to the sheet S or the conveyance path. In this case, the contact heater is disposed so as to contact the surface of the sheet S onto which ink is applied (i.e., an upper surface in FIG. 18). The non-contact heater is disposed upstream from the contact heater in the sheet conveyance direction A and dries the ink on the sheet S to some extent. Accordingly, the contact heater, which is disposed downstream from the non-contact heater, does not deteriorate an image on the sheet S, even if the contact heater contacts the surface of the sheet S onto which the ink is applied.

The non-contact heater is not limited to the hot air blower that blows hot air or the high-frequency dielectric heating unit that emits the high-frequency waves having a predetermined wavelength, and may be another heating energy emitter that emits heating energy for heating the sheet in a non-contact manner. That is, the hot air blower and the high-frequency dielectric heating unit are examples of the heating energy emitter to emit the heating energy, and examples of the heating energy includes hot air, high-frequency waves, and the like. Two or more heating energy emitters described above may be used in combination.

In the above-described embodiment, the heating device includes both the contact heater and the non-contact heater, but the present disclosure is also applicable to a heating device including only one of the contact heater and the non-contact heater.

The present disclosure is not limited to an inkjet image forming apparatus that discharges ink onto a sheet to form an image and is also applicable to a liquid discharge apparatus that discharges liquid other than ink. Examples of the liquid discharge apparatus according to the embodiments of the present disclosure include a liquid discharge apparatus that does not form an image, such as an apparatus that discharges a treatment liquid to a sheet to modify the surface of the sheet before image formation, in addition to the image forming apparatus.

The sheet used in the embodiments of the present disclosure may be any sheet to which a liquid is at least temporarily adhered, such as a sheet onto which the liquid is adhered and fixed or a sheet into which the liquid is adhered to permeate. Specifically, examples of the sheet include a resin film, wallpaper, an electronic substrate, and the like in addition to paper. Examples of the material of the sheet include paper, leather, metal, plastic, glass, wood, and ceramics. Further, the sheet may be continuous sheet (rolled paper) formed in an elongated shape or cut paper cut in advance into a predetermined size. The present disclosure is also applicable to an apparatus that conveys an object other than the sheet and heats the object to which liquid is applied.

As described above, according to the present disclosure, the heating range can be changed in the width direction of the object.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:

a heater configured to heat an object to which a liquid is applied, the object being conveyed in a conveyance direction; and a heating range variable member configured to change a heating range of the heater in a width direction of the object, the width direction being orthogonal to the conveyance direction.

2. The heating device according to claim 1, wherein the heater includes a non-contact heater configured to emit heating energy to heat the object in a non-contact manner, wherein the heating range variable member includes a shield configured to move between a shielding position, between the non-contact heater and the object, and a retracted position retracted from the shielding position, and the shield at the shielding position partially blocks the heating energy in the width direction.

3. The heating device according to claim 2, wherein the shield moves in response to a size of the object in the width direction to change the heating range of the non-contact heater.

4. The heating device according to claim 2, wherein the shield moves in response to a thickness of the object in a height direction orthogonal to each of the conveyance direction and the width direction to change the heating range of the non-contact heater.

5. The heating device according to claim 2, further comprising a temperature detector configured to detect an environmental temperature, wherein the shield moves in response to the environmental temperature detected by the temperature detector to change the heating range of the non-contact heater.

6. The heating device according to claim 2, further comprising an elapsed time measuring device configured to measure an elapsed time after the non-contact heater starts heating the object, wherein the shield moves in response to the elapsed time measured by the elapsed time measuring device to change the heating range of the non-contact heater.

7. The heating device according to claim 1, wherein the heater includes a contact heater configured to contact and heat the object, and the contact heater includes multiple heating sources configured to respectively heat different heating ranges in the width direction.

8. The heating device according to claim 7, wherein each of the multiple heating sources turns on or off in response to a size of the object in the width direction to change the heating range of the contact heater.

9. The heating device according to claim 7, wherein each of the multiple heating sources turns on or off in response to a thickness of the object in a height direction orthogonal to each of the conveyance direction and the width direction to change the heating range of the contact heater.

10. The heating device according to claim 7, further comprising a temperature detector configured to detect an environmental temperature, wherein each of the multiple heating sources turns on or off in response to the environmental temperature detected by the temperature detector to change the heating range of the contact heater.

11. The heating device according to claim 7, further comprising an elapsed time measuring device configured to measure an elapsed time after the contact heater starts heating the object, wherein each of the multiple heating sources turns on or off in response to the elapsed time measured by the elapsed time measuring device to change the heating range of the contact heater.

12. A liquid discharge apparatus comprising a conveyance device configured to convey an object;

a liquid discharge unit configured to discharge a liquid onto the object; and the heating device according to claim 1, to heat the object onto which the liquid is discharged by the liquid discharge unit.

* * * * *